(12) United States Patent
Iga

(10) Patent No.: US 8,023,604 B2
(45) Date of Patent: Sep. 20, 2011

(54) ENCODED DATA TRANSFER DEVICE AND ENCODED DATA TRANSFERRING METHOD

(75) Inventor: Kiichiro Iga, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 901 days.

(21) Appl. No.: 11/806,890

(22) Filed: Jun. 5, 2007

(65) Prior Publication Data
US 2008/0043891 A1 Feb. 21, 2008

(30) Foreign Application Priority Data

Jun. 26, 2006 (JP) ................................ 2006-175450

(51) Int. Cl.
*H04L 7/00* (2006.01)
(52) U.S. Cl. ...................................................... 375/354
(58) Field of Classification Search .................. 375/148, 375/316, 354, 362, 363, 261, 262, 341, 371; 382/166, 199, 232, 234, 260, 233, 239; 348/159, 348/233, 415.1, 416.1, 700
See application file for complete search history.

(56) References Cited

U.S. PATENT DOCUMENTS

| | | | | | |
|---|---|---|---|---|---|
| 4,586,088 | A | * | 4/1986 | Kondo | 358/426.05 |
| 4,887,224 | A | * | 12/1989 | Okano et al. | 345/555 |
| 5,193,169 | A | * | 3/1993 | Ishikawa | 710/22 |
| 5,374,998 | A | * | 12/1994 | Iida | 358/486 |
| 5,434,983 | A | * | 7/1995 | Yaso et al. | 710/110 |
| 5,614,960 | A | * | 3/1997 | Chiba et al. | 348/700 |
| 5,726,768 | A | * | 3/1998 | Ishikawa et al. | 358/442 |
| 6,411,394 | B1 | * | 6/2002 | Nakamura et al. | 358/1.15 |
| 2004/0225759 | A1 | * | 11/2004 | Kohashi | 710/22 |
| 2006/0056712 | A1 | * | 3/2006 | Endo | 382/232 |

FOREIGN PATENT DOCUMENTS

| | | |
|---|---|---|
| CN | 1144010 A | 2/1997 |
| EP | 0 606 076 A1 | 7/1994 |
| GB | 2 262 405 A | 6/1993 |

(Continued)

OTHER PUBLICATIONS

"Extended European Search Report", mailed by EPO and corresponding to European application No. 07 11 1010.0 on Aug. 23, 2010.

(Continued)

*Primary Examiner* — Dac Ha
*Assistant Examiner* — Syed Haider
(74) *Attorney, Agent, or Firm* — Fujitsu Patent Center

(57) ABSTRACT

An encoded data transfer device (1) includes a JPEG compressing section (14) that converts image data to encoded data, a data buffer (15) that stores the encoded data from the JPEG compressing section (14), a stored data amount detecting section (19) that detects the stored data amount of the encoded data stored in the data buffer (15) reaching a predetermined amount DC, a data transfer section (16) that transfers the encoded data stored in the data buffer (15) to the outside in response to a result of the stored data amount detecting section (19), and a transfer data amount detecting section (27) that detects the predetermined amount DC of the encoded data being transferred from the data transferring section (16). In the data buffer (15), transfer from the JPEG compressing section (14) is inhibited in response to a result of the stored data amount detecting section (19), and transfer from the JPEG compressing section (14) is started in response to a transfer data amount detecting section (27).

10 Claims, 5 Drawing Sheets

BLOCK DIAGRAM SHOWING CONFIGURATION OF ENCODED DATA TRANSFER DEVICE ACCORDING TO THE EMBODIMENT

FOREIGN PATENT DOCUMENTS

| | | |
|---|---|---|
| JP | 59-201578 A | 11/1984 |
| JP | 5-61951 A | 3/1993 |
| JP | 09-168150 A | 6/1997 |
| JP | 2004-326180 A | 11/2004 |
| JP | 2006-094225 A | 4/2006 |
| WO | WO 96/17346 A2 | 6/1996 |

OTHER PUBLICATIONS

Japanese Notification of Ground(s) for Rejection, English-language translation, mailed Feb. 1, 2011 for corresponding Japanese Application No. 2006-175450.

* cited by examiner

FIG. 2 TIMING CHART SHOWING OPERATION OF ENCODED DATA TRANSFER DEVICE ACCORDING TO THE EMBODIMENT

FIG.3 TIMING CHART SHOWING OPERATION OF ENCODED DATA TRANSFER DEVICE ACCORDING TO THE EMBODIMENT

TIMING CHART SHOWING OPERATION OF ENCODED DATA TRANSFER DEVICE OF CONVENTIONAL ART

ENCODED DATA TRANSFER DEVICE AND ENCODED DATA TRANSFERRING METHOD

CROSS-REFERENCE TO RELATED APPLICATIONS

This application is based upon and claims the benefit of priority from the prior Japanese Patent Application No. 2006-175450 filed on Jun. 26, 2006, the entire contents of which are incorporated herein by reference.

BACKGROUND OF THE INVENTION

1. Field of the Invention

It is related to a device that encodes and transfers data, and more particularly, it relates to a device that encodes and transfers image data in JPEG format.

2. Description of Related Art

When transferring image data outputted from a CCD sensor or a CMOS image sensor to the outside, in order to reduce the amount of transfer data so as to lower the transfer rate, a method for transferring the image data after converting this to encoded data has been employed. As an example of such a device, shown in FIG. 4 is an encoded data transfer device 100 that transfers image data to the outside after encoding.

The encoded data transfer device 100 includes a CCD 101 that takes in an image, a YCbCr converting section 102 that converts image data outputted from the CCD 101 into a YCbCr format, a line buffer 103 that buffers the image data converted into a YCbCr format, a JPEG compressing section 104 that encodes the image data stored in the line buffer 103 in JPEG format, a data buffer 105 that stores the encoded data, and a data transfer section 106 that transfers the stored encoded data to the outside. Moreover, the encoded data transfer device 100 has a horizontal synchronizing signal generating section 107 and a vertical synchronizing signal generating section 108 that respectively output a horizontal synchronizing signal HSYNC and a vertical synchronizing signal VSYNC outputted together with data when transferring the same to the outside.

In the encoded data transfer device 100, image data is encoded in JPEG format every eight lines, and eight lines of compressed data are outputted to the outside. FIG. 5 shows a timing chart of the encoded data transfer device 100. After an elapse of a blank period TFB since a horizontal synchronizing signal HSYNC, output data ODATA being in encoded data units of eight lines of image data is outputted. Since the output data ODATA has been encoded in JPEG format every eight lines, in comparison with when transferring eight lines of image data without compression, the amount of transfer data can be reduced, and moreover, the transfer rate can be lowered.

In the encoded data transfer device 100, the data amount of output data ODATA changes depending on the condition of image data. For example, since data after encoding is reduced with plane image data, the amount of output data ODATA is reduced, and since data after encoding is increased with complicated image data inversely, the data amount of output data ODATA is increased. In addition, because the horizontal synchronizing signal HSYNC has been outputted at fixed intervals, a period TBB (back blank period) until the next synchronizing signal HSYNC is outputted after output of the output data ODATA is completed changes depending on the data amount of the output data ODATA.

However, when encoding and transferring image data to the outside, if this is carried out in units of a predetermined number of lines of the image data, the data amount of encoded data is not fixed in the transfer data amount at each time of transfer, control of an external importer is complicated, and moreover, this causes an increase in the circuit scale of the external importer device, which is a problem.

SUMMARY OF THE INVENTION

In view of the above-described background arts, an object thereof is to provide an encoded data transfer device that can simplify an encoded data importing control of an external importer device and moreover can simplify a circuit configuration of the external importer device.

To achieve the above object, an encoded data transfer device is provided which comprises a code converting section that converts inputted image data to encoded data; a data buffer that stores the encoded data transferred from the code converting section; a stored data amount detecting section that detects a stored data amount of the encoded data stored in the data buffer reaching a predetermined amount; a data transfer section that transfers the encoded data stored in the data buffer to the outside in response to a result of the stored data amount detecting section; and a transfer data amount detecting section that detects the predetermined amount of the encoded data being transferred from the data transfer section, wherein, in the data buffer, transfer from the code converting section is inhibited in response to a result of the stored data amount detecting section, and transfer from the code converting section is started in response to a result of the stored data amount detecting section.

According to another aspect, an encoded data transferring method is provided which comprises a step of converting inputted image data to encoded data; a step of storing the encoded data in a data buffer; a step of detecting a stored data amount of the encoded data stored in the data buffer reaching a predetermined amount; a step of transferring the encoded data stored in the data buffer to the outside in response to detecting that the stored data amount of the stored encoded data reaches a predetermined amount; and a step of detecting that the encoded data to be transferred to the outside is transferred by only the predetermined amount, wherein, in the data buffer, transfer of the encoded data converted from the inputted image data in the converting step is inhibited in response to detecting that a stored data amount of the stored encoded data reaches a predetermined amount, and transfer of the encoded data converted in the converting step is started in response to detecting that the encoded data to be transferred to the outside is transferred by only the predetermined amount.

Encoded data converted from image data in the code converting section is stored in the data buffer until this reaches a predetermined amount. Furthermore, when the stored data amount in the data buffer reaches the predetermined amount, the stored encoded data is transferred to the outside by only the predetermined amount. Thereby, since the encoded data is transferred to the outside by each predetermined amount, an external encoded data receiver can receive data by carrying out control to receive encoded data by each predetermined amount, and moreover, a circuit configuration of the external encoded data receiver device can be simplified.

The above and further objects and novel features will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, an embodiment of an encoded data transfer device according to the present invention will be described in detail with reference to FIG. 1 to FIG. 3.

Figure 1:
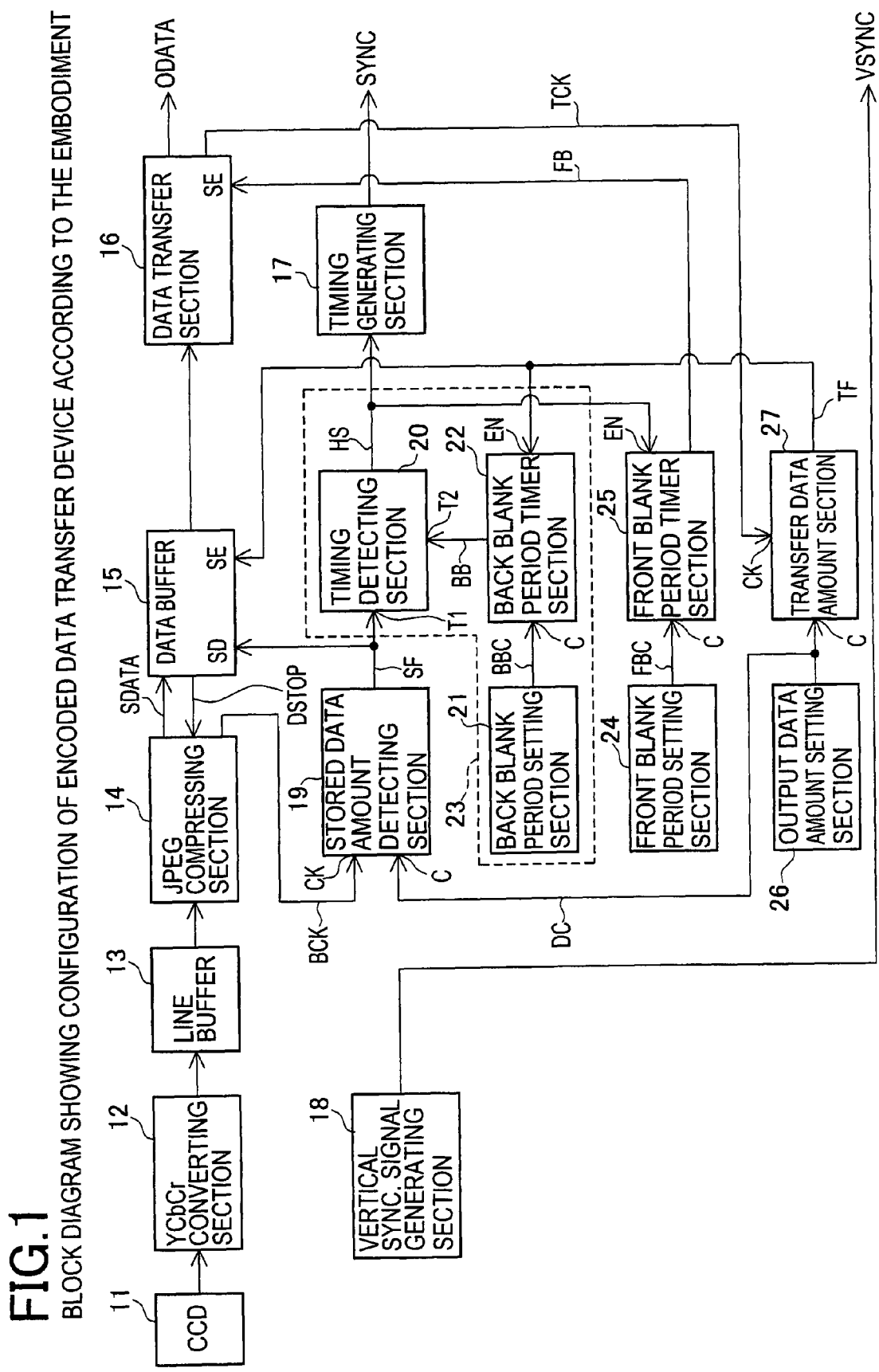
FIG. 1 is a block diagram showing a configuration of an encoded data transfer device according to an embodiment.

FIG. 1 is a block diagram showing a configuration of an encoded data transfer device 1 according to the present embodiment. The encoded data transfer device 1 includes a CCD 11, a YCbCr converting section 12, a line buffer 13, a JPEG compressing section 14, a data buffer 15, a data transfer section 16, a timing generating section 17, a vertical synchronizing signal generating section 18, a stored data amount detecting section 19, a timing detecting section 20, a back blank period setting section 21, a back blank period timer section 22, a front blank period setting section 24, a front blank period timer section 25, an output data amount setting section 26, and a transfer data amount detecting section 27.

The CCD 11 is provided as an image pickup device to capture an imaging object. For the CCD 11, a color filter element having any one of the three primary color (RGB) components for each pixel position is arranged at each pixel in a matrix form, and in the CCD 11, specific color component pixel information is obtained from the respective pixel positions.

In the YCbCr converting section 12, the color component pixel information obtained in the CCD 11 is converted into a luminance-chrominance (YCbCr) color space and is further converted into a 422 format (YCbCr 422 format). In the YCbCr 422 format, when respective pieces of pixel information form 8×8 pixels, luminance (Y) information is 8×8 pixels, while respective pieces of chrominance information (CbCr) are each skipped to 4×8 pixels. The converted image data in the YCbCr 422 format is stored in the line buffer 13.

In the vertical synchronizing signal generating section 18, a vertical synchronizing signal VSYNC in synchronization with the CCD 11 and the YCbCr converting section 12 is generated based on a control signal from an unillustrated control section.

In the JPEG compressing section 14, the image data stored in the line buffer 13 is encoded in JPEG format, and encoded data SDATA is outputted in synchronization with a data clock BCK. The encoded data SDATA is stored in the data buffer 15. Here, the data buffer 15 has an identical size as a predetermined data amount DC to be described below. Thereby, the capacity of the data buffer 15 can be efficiently used without waste.

Here, the data buffer 15 includes a transmission suppression terminal SD and a transmission start terminal SE. When an active pulse is inputted to the transmission suppression terminal SD, an inhibiting signal DSTOP to stop JPEG encoding is outputted to the JPEG compressing section 14, transmission of the encoded data SDATA from the data buffer 15 is inhibited.

In the data transfer section 16, in response to an active pulse inputted to the transmission start terminal SE, the encoded data stored in the data buffer 15 is transmitted as output data ODATA in synchronization with a synchronizing clock TCK.

In the transfer data amount detecting section 27, the synchronizing clock TCK is inputted to a clock terminal CK, the synchronizing clocks TCK are counted to a quantity corresponding to a predetermined data amount DC set by the output data amount setting section 26. When the synchronizing clocks TCK have reached the quantity corresponding to the predetermined data amount DC, an active pulse is outputted to a transfer data amount detecting signal TF.

The stored data amount detecting section 19 is a part that detects the predetermined data amount DC set by the output data amount setting section 26 based on the count of the data clocks BCK from the JPEG compressing section 14. More specifically, in the stored data amount detecting section 19, the data clock BCK is inputted to a clock terminal CK, the predetermined data amount DC from the data amount setting section 26 is set to a count quantity terminal C, and when the count quantity of the data clocks BCK coincides with the quantity corresponding to the predetermined data amount DC, an active pulse is outputted to a stored data amount detecting signal SF.

In the back blank period timer section 22, the transfer data amount detecting signal TF is inputted to a count enabling terminal EN. When the transfer data amount detecting signal TF is activated, an active pulse is outputted to a back blank signal BB after an elapse of a minimum back blank period BBC set by the back blank period setting section 21.

The timing detecting section 20 includes timing input terminals T1 and T2, at a later timing of the timing input terminals T1 and T2, an active pulse is outputted to a synchronizing signal HS. More specifically, in the timing detecting section 20, an active pulse is outputted at a later timing of either the stored data amount detecting signal SF resulting from counting by the stored data amount detecting section 19 being activated or the back blank signal BB from the back blank period timer section 22 being activated. Here, the timing detecting section 20, the back blank period setting section 21, and the back blank period timer section 22 form a synchronizing signal generating section 23.

In the timing generating section 17, in response to the active pulse of the synchronizing signal HS, an external synchronizing signal SYNC having a predetermined width of a period is outputted.

In the front blank period timer section 25, the synchronizing signal HS is inputted to a count enabling terminal EN. When the synchronizing signal HS is activated, an active pulse is outputted to a front blank signal FB after an elapse of a front blank period FBC set by the front blank period setting section 24.

Next, operations of the encoded data transfer device 1 according to the present embodiment will be described. FIG. 2 is a timing chart showing operations of the encoded data transfer device 1 according to the present embodiment.

At (1), when an active pulse is outputted to the synchronizing signal HS, in order to secure a front blank period TFB from a rising edge of the external synchronizing signal SYNC to an output of the first ODATA (OD1), an active pulse is outputted to the front blank signal FB after an elapse of the front blank period FBC in the front blank period timer section 25.

At (2), when an active pulse is outputted to the front blank signal FB, in the data transfer section 16, transfer from the data buffer 15 to the output data ODATA is started. In a period of (3), output data OD1 to ODn (n means a number of pieces of the predetermined data amount DC) are transferred.

At (4), when the count value of synchronizing clocks TCK outputted together with the output data ODATA from the data transfer section 16, which are counted by the transfer data amount detecting section 27, has reached a quantity corresponding to the predetermined data amount DC, an active pulse is outputted to the transfer data amount detecting signal TF.

At (5), when an active pulse is outputted to the transfer data amount detecting signal TF, transfer of the decoded data SDATA from the JPEG compressing section 14 to the data buffer 15 is started. In a period of (6), encoded data SD1 to SDn (n means a number of pieces of the predetermined data amount DC) are transferred.

At (7), when the count value of data clocks BCK outputted together with the encoded data SDATA from the JPEG compressing section 14, which are counted by the stored data amount detecting section 19, has reached a quantity corresponding to the predetermined data amount DC, an active pulse is outputted to the stored data amount detecting signal SF.

At (8), when an active pulse is outputted to the transfer data amount detecting signal TF, in order to secure a minimum back blank period TBB from an end of output of the last ODATA (ODn) to a rising edge of the external synchronizing signal SYNC, an active pulse is outputted to the back blank signal BB after an elapse of the minimum back blank period BBC in the back blank period timer section 22.

At (9), an active pulse is outputted to the synchronizing signal HS in response to the stored data amount detecting signal SF being at a timing later in output of an active pulse between the stored data amount detecting signal SF and the back blank signal BB.

At (10), in the timing generating section 17, a low-level active pulse of the external synchronizing signal SYNC for a preset period is outputted in response to an input of the synchronizing signal HS.

Figure 2:
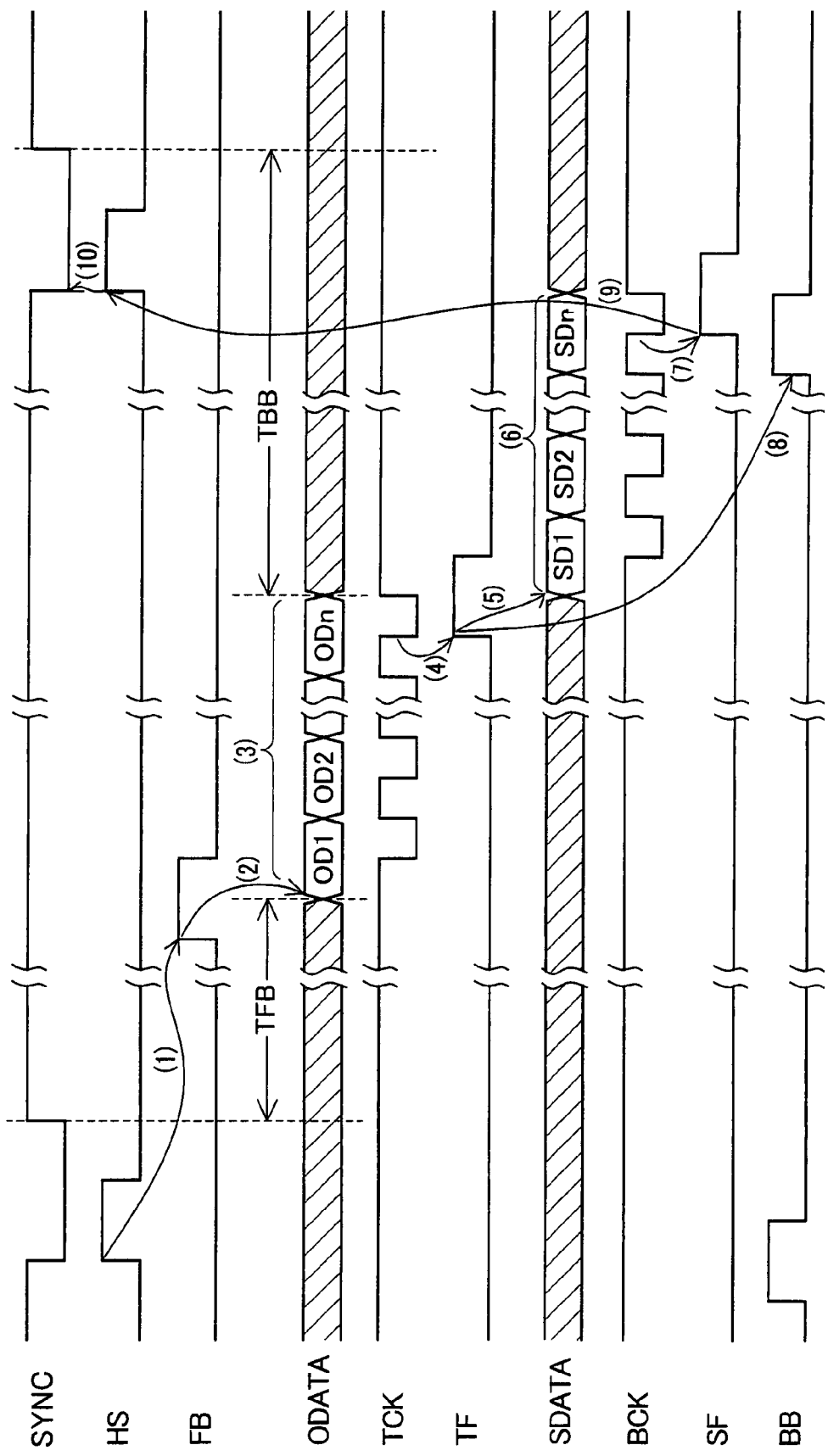
FIG. 2 is a timing chart showing operations of the encoded data transfer device according to the embodiment.
Figure 3:
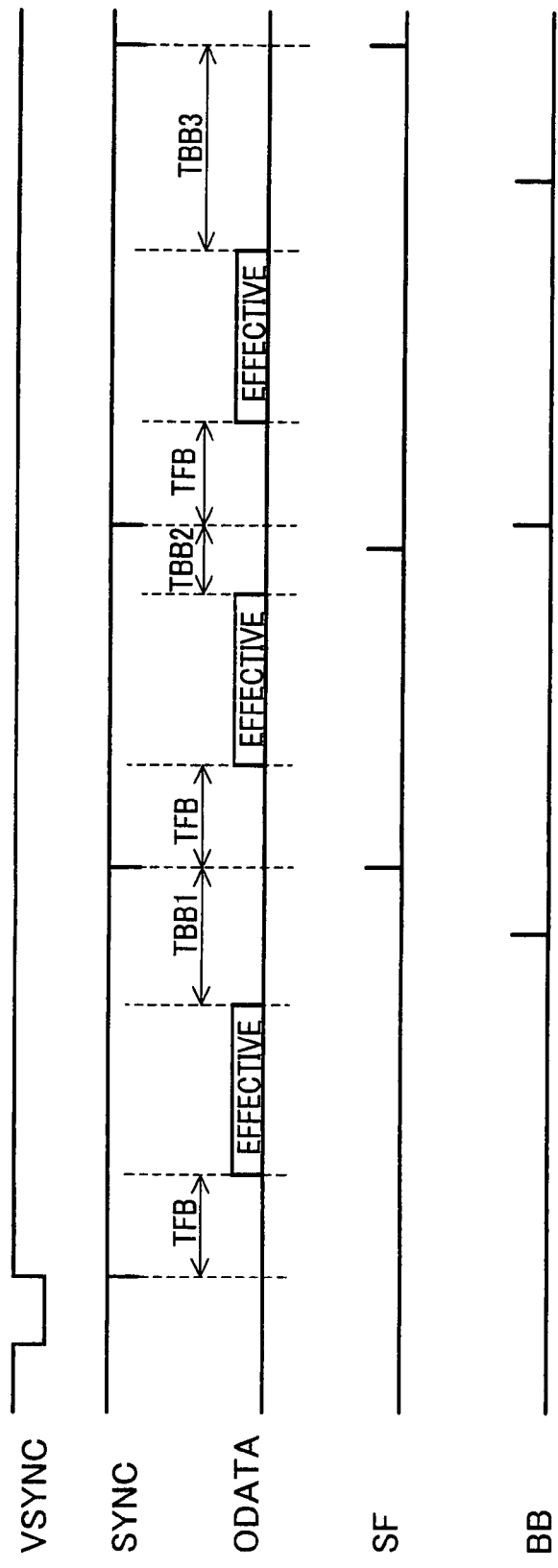
FIG. 3 is a timing chart showing operations of the encoded data transfer device according to the embodiment.
Figure 4:
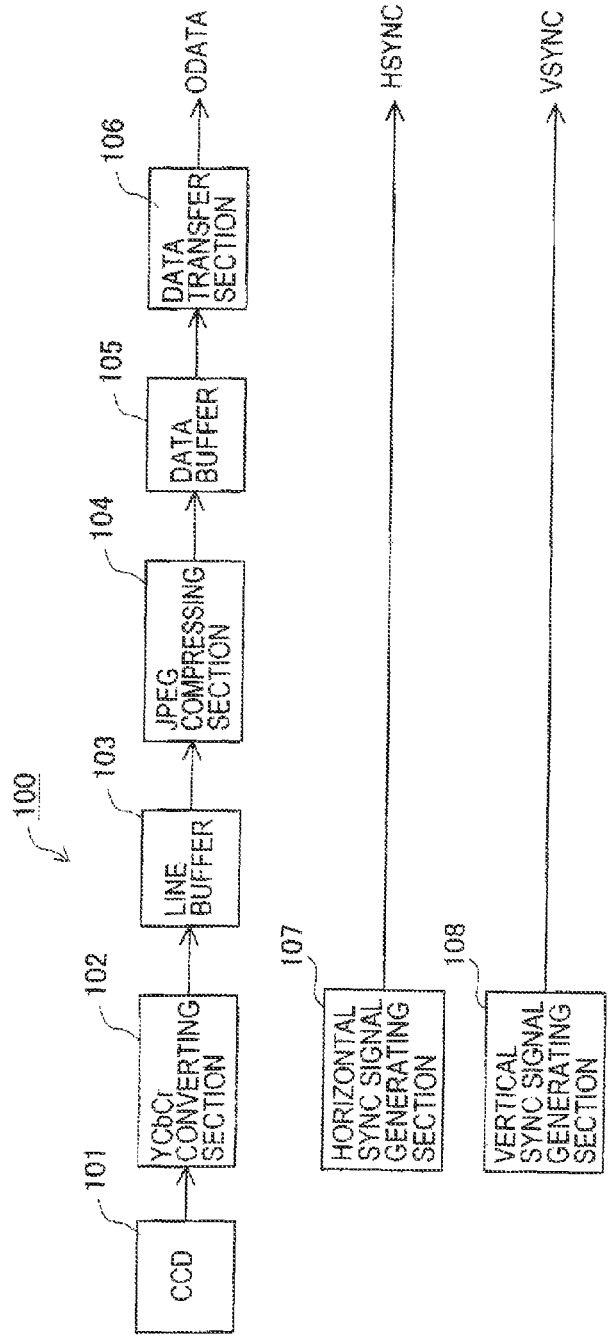
FIG. 4 is a block diagram showing a configuration of an encoded data transfer device of a conventional art.
Figure 5:
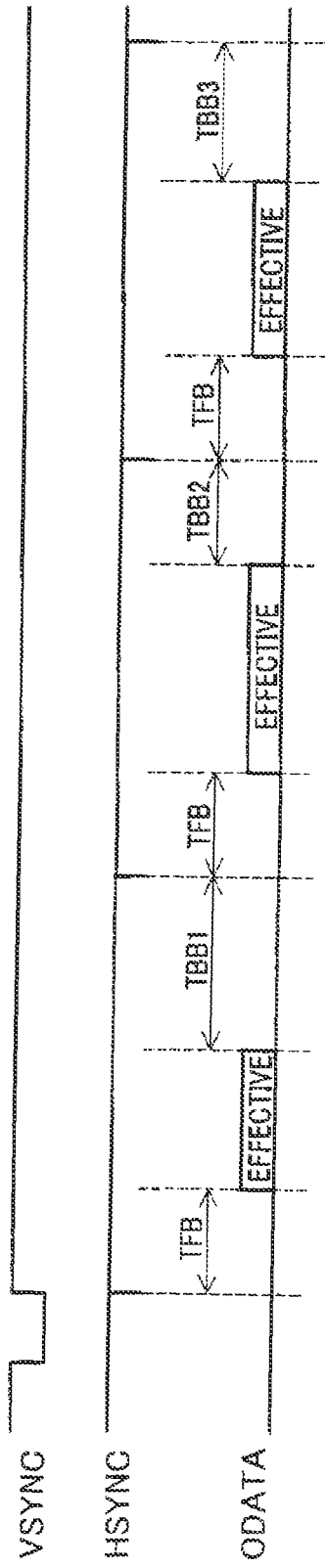
FIG. 5 is a timing chart showing operations of the encoded data transfer device of the conventional art.

FIG. 3 shows a timing chart in a period longer than that of FIG. 2 including three external synchronizing signals SYNC showing operations of the encoded data transfer device 1 according to the embodiment. In the encoded data transfer device 1 according to the present embodiment, since the amount of the output data ODATA is fixed, a period for which the output data ODATA is effective is fixed in each period corresponding to the external synchronizing signal SYNC. Moreover, the front blank period TFB being a period until the output data ODATA is outputted after a fall of the external synchronizing signal SYNC can also be provided at fixed intervals by a count of the front blank period timer section 25.

On the other hand, with regard to back blank periods TBB1 to TBB3 each being a period from completion of an effective output period of the output data ODATA to the external synchronizing signal SYNC, the back blank periods TBB1 and TBB3 are determined in their periods by active pulses of the stored data amount detecting signal SF, respectively, and the back blank period TBB2 is determined in its period by an active pulse of the back blank signal BB. More specifically, not only can a period of transfer from the JPEG compressing section 14 to the data buffer 15 be compensated for, but also the minimum back blank period BBC can be assured even when the period of transfer from the JPEG compressing section 14 to the data buffer 15 is short.

As has been described in detail in the above, by the encoded data transfer device 1 according to the present embodiment, an external encoded data receiver can receive data by carrying out control to receive encoded data by each predetermined amount, and moreover, a circuit configuration of the external encoded data receiver device can be simplified.

It should be noted that the present invention is by no means limited to the foregoing embodiment, and as a matter of course, various improvements and modifications can be made to the present invention without departing from the scope and spirit thereof.

For example, in the present embodiment, a description has been given of the JPEG compressing section that forms a means for compressing image data by using JPEG encoding, however, the present invention is not limited hereto, and can, as a matter of course, be applied to a case using another compression method, for example, an MPEG compression method, as well.

The JPEG compressing section is an example of a code converting section, the timing detecting section, the back blank period setting section, and the back blank period timer section are examples of synchronizing signal generating sections, the back blank period is an example of a first predetermined period, the back blank period timer section is an example of a first predetermined period timer section, the front blank period is an example of a second predetermined period, and the front blank period timer section is an example of a second predetermined period timer section.

According to the present invention, it becomes possible to provide an encoded data transfer device that can simplify an encoded data importing control of an external importer device and moreover can simplify a circuit configuration of the external importer device.

What is claimed is:

1. An encoded data transfer device comprising:
a code converting section that converts inputted image data to encoded data;
a data buffer that stores the encoded data transferred from the code converting section;
a stored data amount detecting section that detects a stored data amount of the encoded data stored in the data buffer reaching a predetermined amount;
a data transfer section that transfers the encoded data stored in the data buffer to the outside in response to a first detecting result of the stored data amount detecting section; and
a transfer data amount detecting section that detects the predetermined amount of the encoded data being transferred from the data transfer section,
wherein, upon receipt of each of first synchronizing clocks for transferring the encoded data at the data transfer section, the transfer data amount detecting section counts the number of the first synchronizing clocks and when the number of the first synchronizing clocks reaches a first value, a transfer data amount detecting signal is transmitted to the data buffer, and
upon receipt of a second synchronizing clock for outputting the encoded data at the code converting section, the stored data amount detecting section counts second synchronizing clocks and when the second synchronizing clocks reach a second value, a stored data amount detecting signal is transmitted to the data buffer, and
wherein, in the data buffer, transfer of the encoded data from the code converting section is inhibited in response to the stored data amount detecting signal which is the first detecting result of the stored data amount detecting section, and transfer of the encoded data from the code converting section is started in response to the transferred data amount detecting signal which is a second detecting result of the transfer data amount detecting section.

2. The encoded data transfer device according to claim 1, further comprising:
  a synchronizing signal generating section that generates a synchronizing signal in response to the first detecting result of the stored data amount detecting section.

3. The encoded data transfer device according to claim 2, wherein
  the synchronizing signal generating section includes:
  a first predetermined period timer section that times a first predetermined period set in advance after a timing of the second detecting result of the transferred data amount detecting section; and
  a timing detecting section that detects a later timing of a result from the stored data amount detecting section and a result from the first predetermined period timer section, and
  the synchronizing signal generating section generates the synchronizing signal in response to a result of the timing detecting section.

4. The encoded data transfer device according to claim 2, further comprising a second predetermined period timer section that times a second predetermined period set in advance after output of the synchronizing signal,
  wherein the data transfer section transfers the encoded data stored in the data buffer to the outside in response to output of the second predetermined period timer section.

5. The encoded data transfer device according to claim 1, wherein the data buffer has a capacity the same in size as the predetermined amount.

6. An encoded data transferring method comprising:
  converting inputted image data to encoded data;
  storing the encoded data in a data buffer;
  detecting a stored data amount of the encoded data stored in the data buffer reaching a predetermined amount;
  transferring the encoded data stored in the data buffer to the outside in response to a first detecting result of the detecting the stored data amount of the encoded data stored in the data buffer reaching the predetermined amount; and
  detecting a transferred data amount of the encoded data transferred to the outside reaching the predetermined amount,
  wherein, upon receipt of each of first synchronizing clocks from the transferring, the detecting the transferred data amount of the encoded data includes counting the number of the first synchronizing clocks and transmitting a transfer data amount detecting signal to the data buffer when the number of the first synchronizing clocks reach a first value, and
  upon receipt of each of second synchronizing clocks from the converting, the detecting the stored data amount of the encoded data includes counting the number of the second synchronizing clocks and transmitting a stored data amount detecting signal to the data buffer when the number of the second synchronizing clocks reach a second value, and
  wherein, in the data buffer, transfer of the encoded data converted from the inputted image data in the converting is inhibited in response to the stored data amount detecting signal which is the first detecting result of the detecting the stored data amount of the encoded data stored in the data buffer reaching the predetermined amount, and transfer of the encoded data is started in response to the transfer data amount detecting signal which is a second detecting result of the detecting the transferred data amount of the encoded data transferred to the outside reaching the predetermined amount.

7. The encoded data transferring method according to claim 6, further comprising:
  generating a synchronizing signal in response to the first detecting result of the detecting the stored data amount of the encoded data stored in the data buffer reaching the predetermined amount.

8. The encoded data transferring method according to claim 7, wherein
  the generating the synchronizing signal includes:
  timing a first predetermined period set in advance after the detecting the transferred data amount of the encoded data transferred reaching the predetermined amount; and
  detecting a later timing of the detecting the stored data amount of the encoded data stored in the data buffer reaching the predetermined amount and the timing the first predetermined period, and
  the generating the synchronizing signal includes generating the synchronizing signal in response to the detecting the later timing.

9. The encoded data transferring method according to claim 7, further comprising:
  timing a second predetermined period set in advance after output of the synchronizing signal,
  wherein, in the transferring the encoded data stored in the data buffer to the outside, the encoded data stored in the data buffer is transferred to the outside in response to the timing the second predetermined period.

10. The encoded data transfer device according to claim 3, wherein, upon receipt of a second synchronizing clock for outputting the encoded data at the code converting section, the stored data amount detecting section counts second synchronizing clocks and when the second synchronizing clocks reach a third value, a stored data amount detecting signal is outputted to the timing detecting section.

* * * * *